United States Patent [19]

Yoo

[11] Patent Number: 5,333,063

[45] Date of Patent: Jul. 26, 1994

[54] IMAGE PROCESSING SYSTEM AND DATA MODULATION/DEMODULATION METHOD THEREOF

[75] Inventor: Jae Chern Yoo, Seoul, Rep. of Korea

[73] Assignee: SamSung Electronics Co., Ltd., Suwon, Rep. of Korea

[21] Appl. No.: 683,712

[22] Filed: Apr. 11, 1991

[30] Foreign Application Priority Data

Sep. 29, 1990 [KR] Rep. of Korea .............. 90-15853

[51] Int. Cl.$^5$ ............................................. H04N 1/41
[52] U.S. Cl. ........................ 358/448; 358/426; 375/122
[58] Field of Search ............. 358/426, 448, 23, 133; 375/27, 122; 381/29, 31, 41; H04N 1/41

[56] References Cited

U.S. PATENT DOCUMENTS 4,933,957  6/1990  Bottau et al. ................. 375/27
4,974,099 11/1990  Lin et al. ...................... 375/122
5,103,306  4/1992  Weiman et al. ............... 358/133

*Primary Examiner*—Mark R. Powell
*Assistant Examiner*—Kim Yen Vu
*Attorney, Agent, or Firm*—Robert E. Bushnell

[57] ABSTRACT

The present invention relates to an image processing system and data modulation/demodulation method thereof which compresses level of an input image information to that of an audio information to transfer them through conventional telephone liens after reproducing the stored data stored in a memory. This invention makes it possible to compress or reconstruct the image data without loss. The input image data are compressed to audio data level by factorial-code-conversion, cubic-code-conversion, and FASCM conversion, and are again reconstructed to an original image data by inverse.

30 Claims, 8 Drawing Sheets

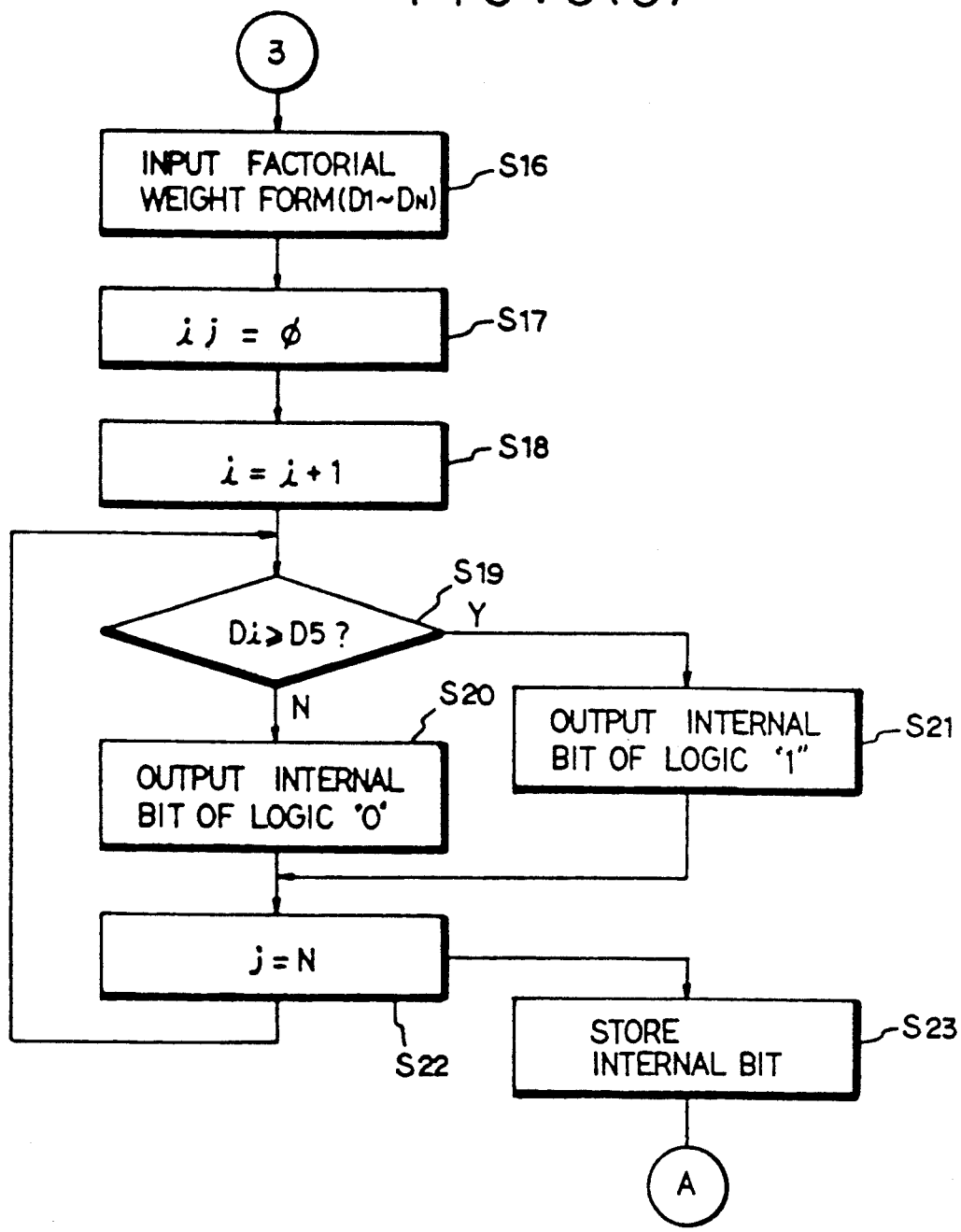

IMAGE PROCESSING SYSTEM AND DATA MODULATION/DEMODULATION METHOD THEREOF

BACKGROUND OF THE INVENTION

The present invention relates to an image processing system and data modulation/demodulation method thereof and, more particularly, to an image processing system which compresses an input image data to an audio signal level and then transfers the data through conventional telephone lines after reproducing the image data stored in a memory. Such a system also makes it possible to compress or reconstruct the image data without loss.

Generally, in the image processing system such as a video tape recorder (VTR), the image data are sorted in a magnetic recording media, and played back again if desired. However, there is a problem in that in order to play back the stored image data, a drum is always required, since tapes and disks are usually used as the magnetic recording media. Further, the image data are extended over a high frequency band and they are impossible to transfer. Therefore, a frequency band of 108 Hz is required for digital image processing and the capacity of a memory must be very large.

Conversely, a recording wavelength λ is the ratio of a tape velocity υ to a frequency f. That is, λ=υ/f. In order to record the image signal of a high frequency band, rotary-head drums which are able to play back the recorded signal beyond the predetermined wavelength λ by increasing a relative velocity have been proposed, but these drums have some limitations in minimizing the size of the video tape recorder.

SUMMARY OF THE INVENTION

It is an object of the present invention to provide an image processing system and a data modulation/demodulation method thereof which replaces the rotary had drum with a fixed-head drum, or removes the drum itself by compressing the input image data of a high frequency band to an audio data level of a low frequency band, eliminating data loss and transferring the input image data through the conventional telephone lines. The object can be achieved in such a manner that the input image data of a certain range are compressed and incorporated with new input image data to be compressed again repeatedly.

The present invention is comprised of a transmitter including an image processing circuit which provides input image data to a single information channel, an analog-to-digital converter connected to an output stage of the image processing circuit, a data compression device connected to an output stage of the analog-to-digital converter for compressing the input image data to audio data level, a first memory connected to an output stage of the data compression device for storing the compressed data, and a transmitting circuit connected to the output stage of the first memory for transmitting the data through the conventional communication network, a receiver, including a receiving circuit for receiving the data transmitted from the transmitting circuit in the transmitter, a second memory connected to the output stage of the receiving circuit for storing the transmitted data, a data reconstruction device connected to the output stage of the second memory for reconstructing an original data from the compressed data, and a data processing circuit connected to the data reconstruction device for displaying the data on a screen.

According to the present invention there is also provided a data modulation/demodulation method comprising: a data compression process including a factorial-code-conversion routine for converting an input digital data to factorial-codes, a cubic-code-conversion routine for converting the factorial weight form provided from the factorial-code-conversion routine to cubic-codes, a factorial-adaptive-size-comparison-method (FASCM) routine for comparing the magnitude of the cubic data and providing internal and adaptive bits, ; a data reconstruction process including an inverse factorial-adaptive-size-comparison-method routine for converting the compressed data to the factorial weight form which are comparable with each other, an inverse cubic-code-conversion routine for extracting the factorial-codes from the data of the inverse FASCM routine, and an inverse factorial-code-conversion routine for reconstructing the factorial-codes to original data.

BRIEF DESCRIPTION OF THE DRAWINGS

These and other objects, features, and advantages of the present invention will become more apparent from the following description of the preferred embodiments taken in conjunction with the accompanying drawings, in which:

FIGS. 3(A)~(G) are subroutine flowcharts illustrating an data modulation/demodulation method according to the present invention.

DETAILED DESCRIPTION OF THE PREFERRED EMBODIMENT

An embodiment of the present invention will be described below with reference to the accompanying drawings.

Figure 1A:
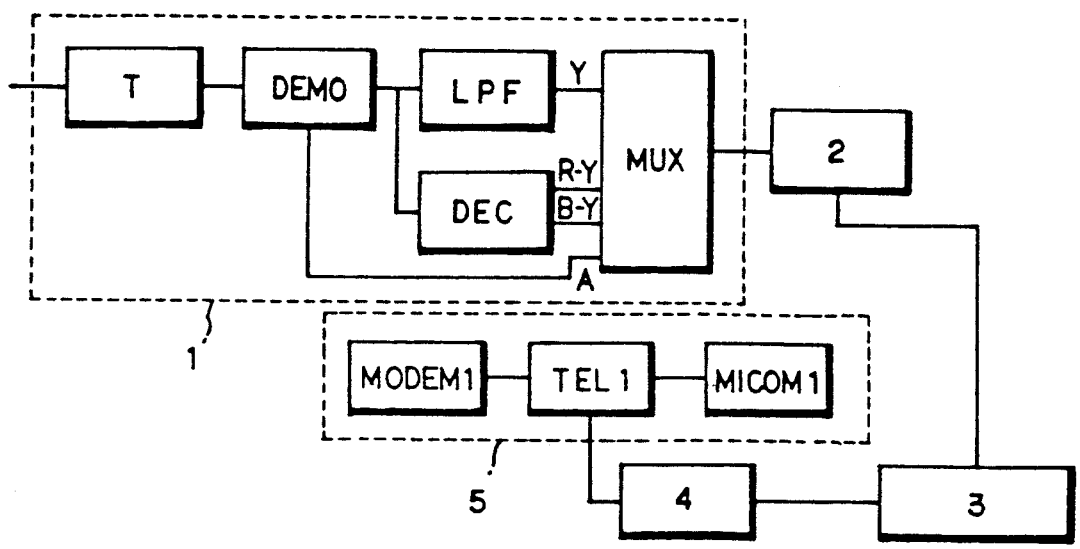
FIGS. 1(A) and (B) are block diagrams of a transmitter and a receiver in an image processing system according to the present invention, respectively.

FIGS. 1(A) and (B) show block diagrams each illustrating a transmitter and a receiver in an image processing system according to the present invention. The transmitter, which compresses and transmits an data to be inputted, comprises an image processing circuit 1, an A/D converter 2, a data compression device 3, a first memory 4, and a transmitting circuit 5. The receiver, which reconstructs the received image data and displays it on a screen, comprises a receiving circuit 6, a second memory 7, a data reconstruction device 8, and a data processing circuit 9.

To describe the transmitter of FIG. 1(A) in detail, the A/D converter 2 is connected to the image processing circuit 1 which processes the image data received through a tuner T. Subsequently, the data compression device 3 connected to the A/D converter 2 compresses the level of the input image data to that of audio data. The first memory 4 is connected to the data compression device 3 to store the compressed data. The transmitting circuit 5 connected to the first memory 4 transmits the data stored in the first memory 4 through the conventional telephone lines.

Figure 1B:
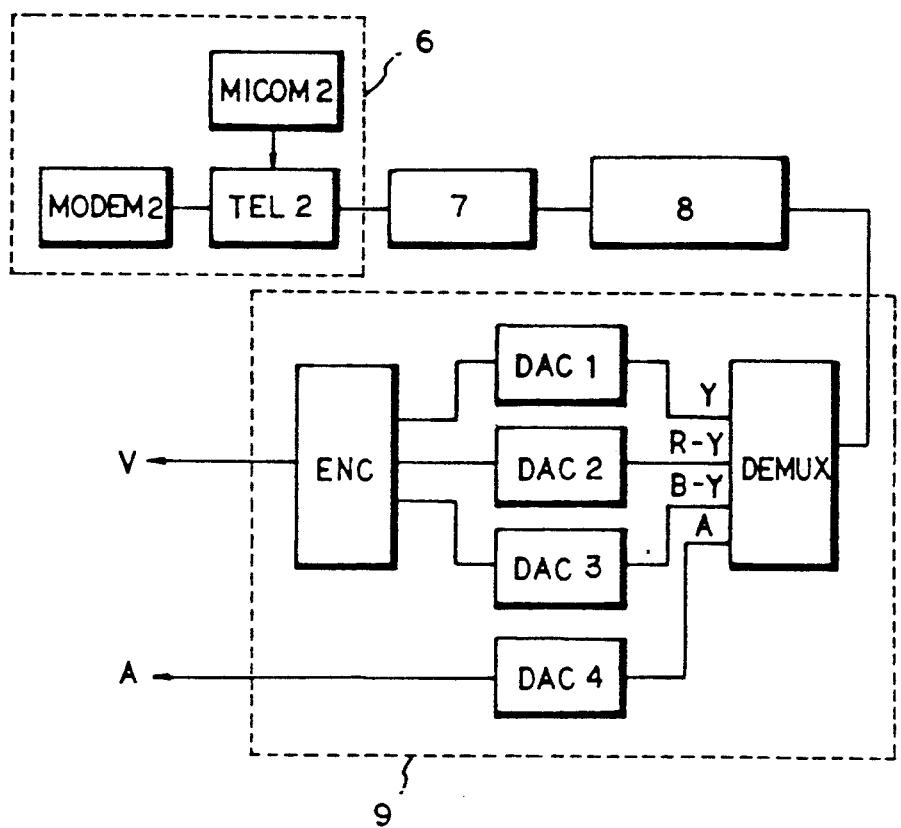

In the receiver of FIG. 1(B), the second memory 7 connected to the receiving circuit 6 receives the image data transmitted from the transmitting circuit 5 in the transmitter through the conventional telephones lines, and the data reconstruction device 8 is connected to the second memory 7.

Subsequently, the data processing circuit 9 connected to the data reconstruction device 8 displays the reconstructed data on a screen. The image processing circuit 1 in the transmitter includes a tuner T, a demodulator DEMO, a low pass filter LPF, a decoder DEC, and a multiplexer MUX.

To describe the image processing circuit 1 in more detail, the demodulator DEMO for demodulating the image signal is connected to the tuner T for extracting the image data and to both the decoder DEC for separating the demodulated signal into color difference signals, and the low pass filter LPV. Subsequently, the multiplexer MUX for selecting one signal from a luminance signal Y provided from the low pass filter LPF, color difference signals R-Y, B-Y provided from the decoder DEC, and an audio signal provided from the demodulator DEMO, for transmitting the selected data to a single information channel, is connected to the A/D converter 2.

Conversely, a first telephone TEL1 is connected to the first memory 4, and a first modulator/demodulator MODEM1 and a first microcomputer MICOM1 are connected to each other through the first telephone TEL1 in the transmitting circuit 5. The receiving circuit 6 in the receiver has a second telephone TEL2, a second modulator/demodulator MODEM2 and a second microcomputer MICOM2, similar to the transmitting circuit 5. Also, the data processing circuit 9 includes a demultiplexer DEMUX for distributing the data transmitted through a single information channel to many channels, four digital-to-analog (D/A) converters DAC 1-DAC4 for converting digital to analog signals luminance signal Y, digital color difference signals R-Y, B-Y, a digital audio signal provided from the demultiplexer DEMUX to each analog signal, and an encoder ENC for incorporating the analog brightness signal Y with analog color difference signals R-Y, B-Y provided from the D/A converters DAC1-DAC3 to yield pictorial image data. Accordingly, the encoder ENC produces the image data and the D/A converter DAC4 displays an audio signal A on the screen.

Figure 2B:
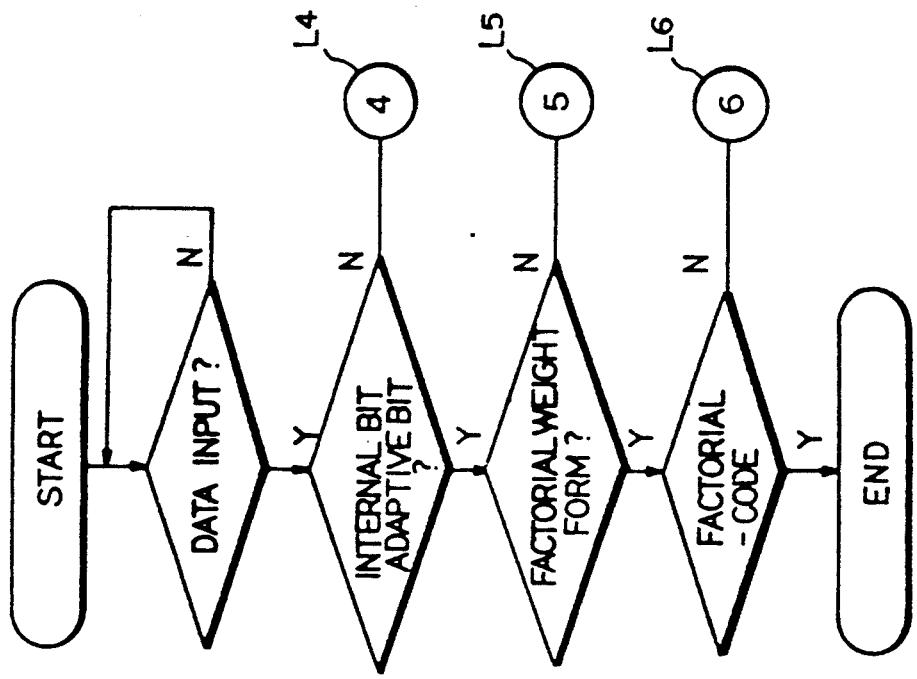
FIGS. 2(A) and (B) are main flowcharts illustrating an data modulation/demodulation method according to the present invention.
Figure 2A:
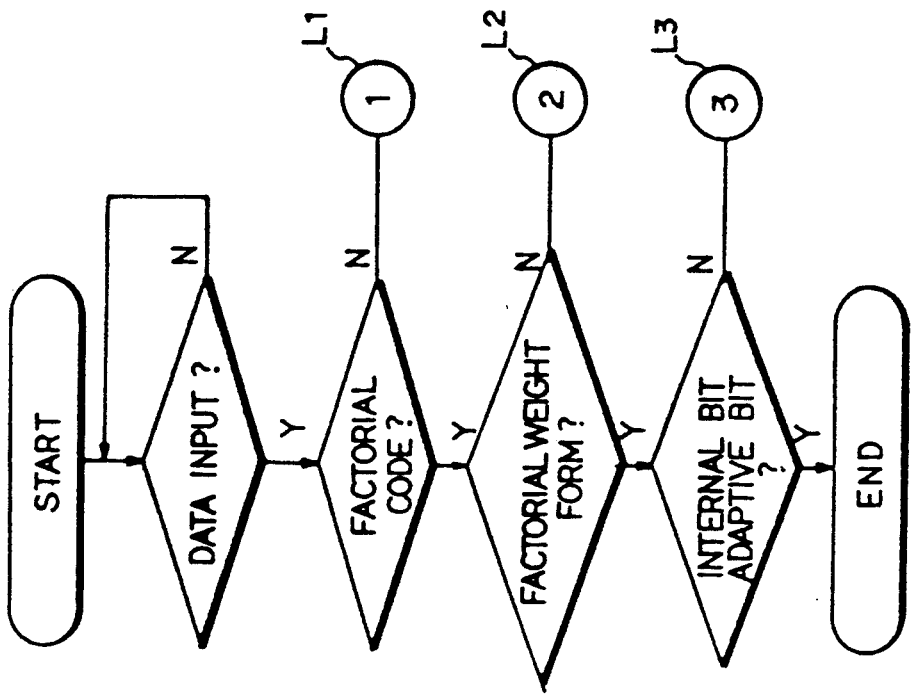

FIGS. 2(A) and (B) represent main flowcharts showing the data compression process and data reconstruction process according to the present invention. The data compression process comprises a factorial-code-conversion routine L1 for converting input digital data to a factorial weight form, a cubic-code-conversion routine L2 for converting the factorial-code to a cubic-code and a factorial adaptive size comparison method (FASCM) routine L3 for comparing the cubic-codes and for providing internal and adaptive bits, as shown in FIG. 2(A). Next, the data reconstruction process comprises an inverse FASCM routine L4 for converting the data provided from the second memory 7 to the factorial weight form, an inverse cubic-code-conversion routine L5 for converting the factorial weight form provided by the inverse FASCM routine L4 to the factorial-code, and an inverse factorial-code conversion routine L6 for converting the factorial-code to original data. FIGS. 3(A)~(D) represent the subroutines to be executed in the data compression process according to the present invention.

Figure 3A:
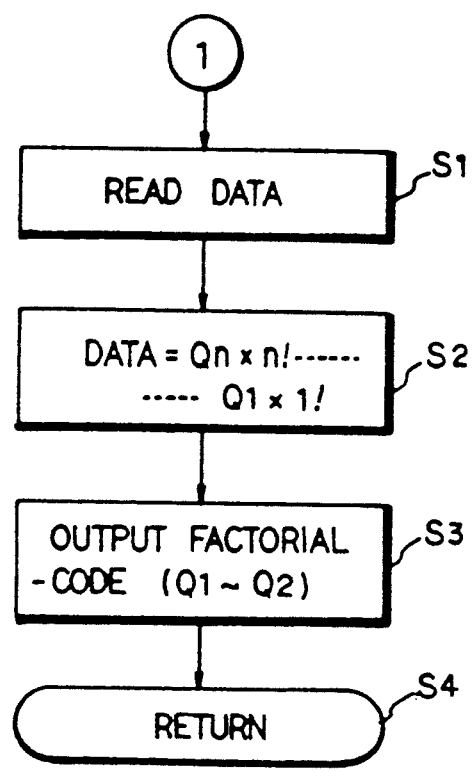
Figure 3B:
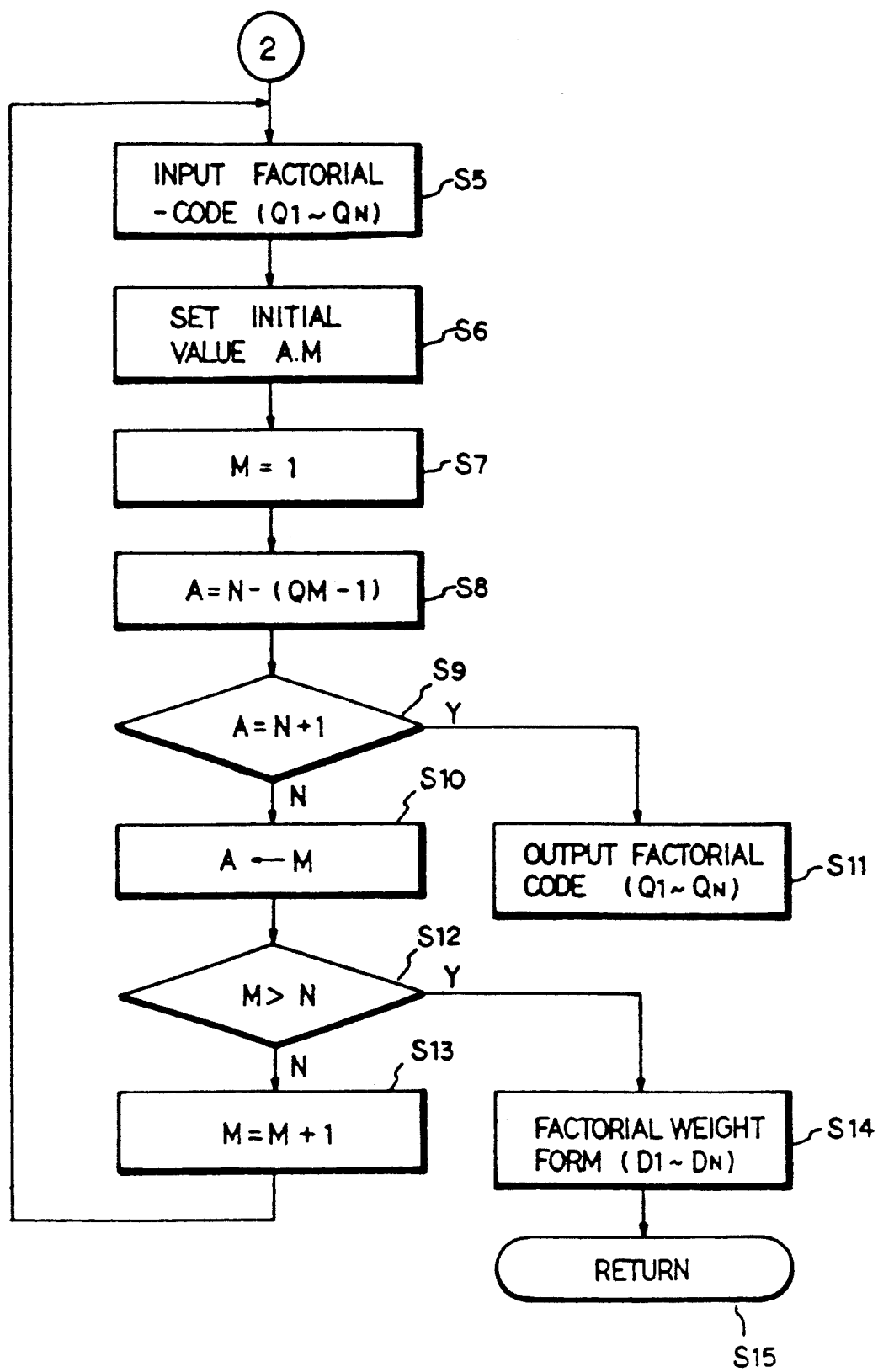
Figure 3D:
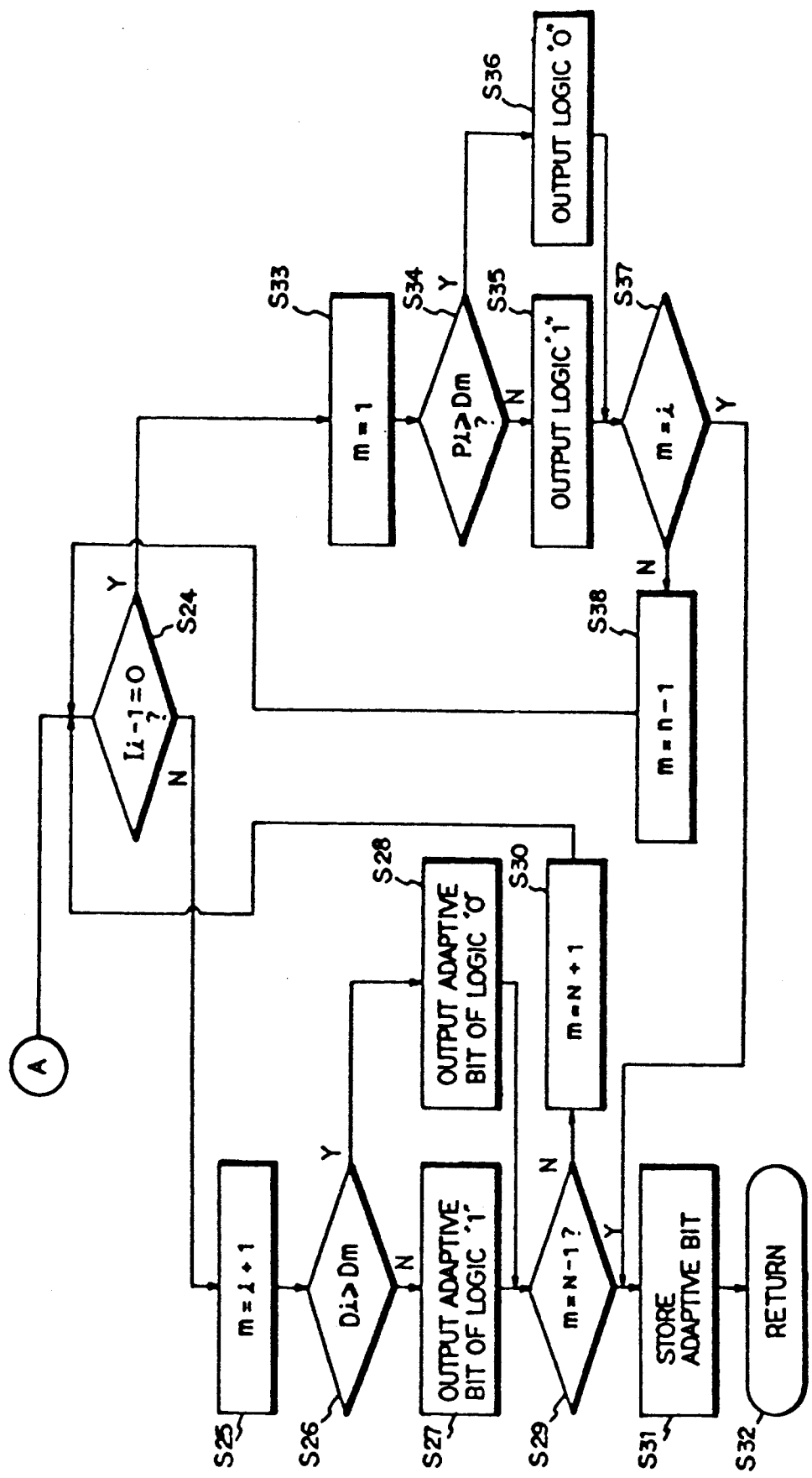
Figure 3G:
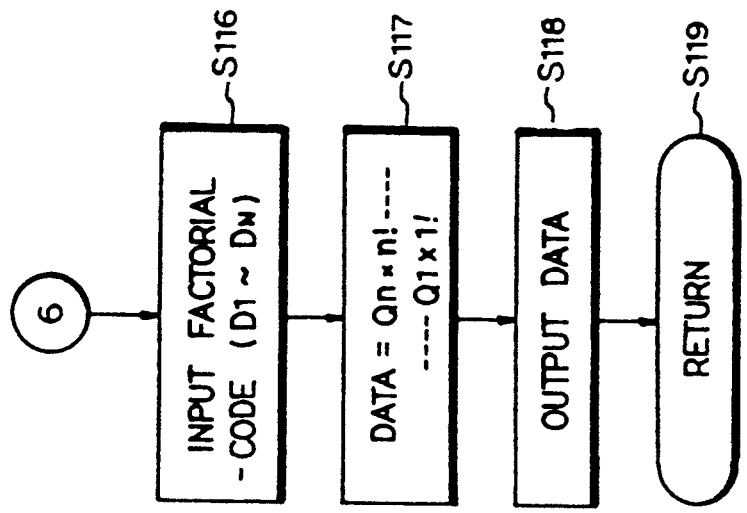
Figure 3E:
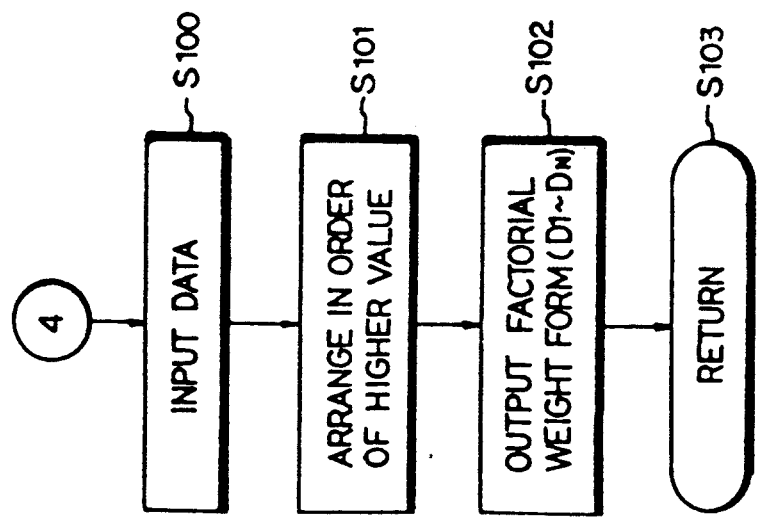
Figure 3F:
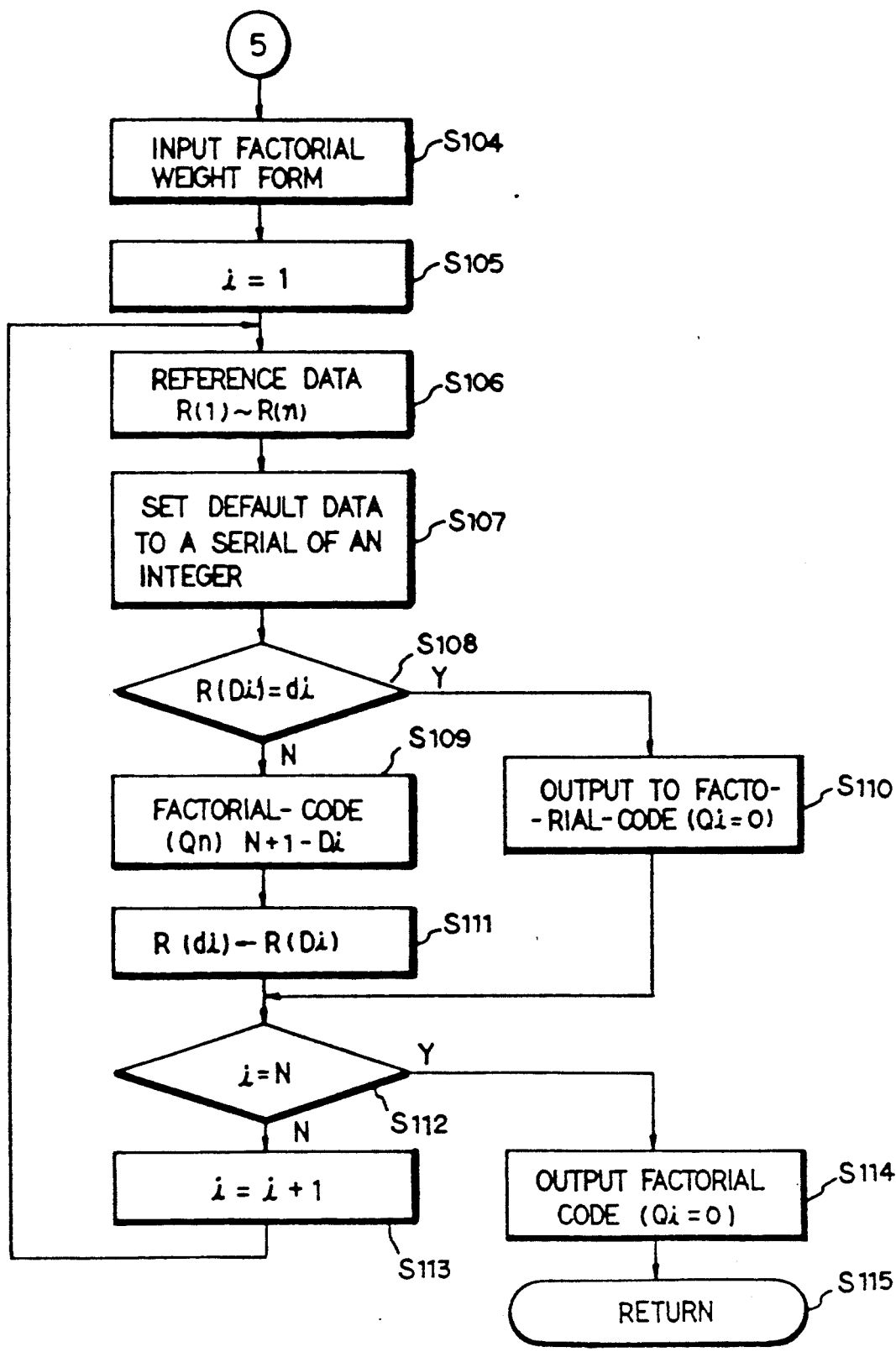

In the data compression process the input digital data of 40 kbits stored in aRAM(Random Access Memory) is compressed to 20 kbit data, and this data of 20 kbits is incorporated with a new input data of 20 kbits, and this incorporated 40 kbit data is again compressed. This compression is repeated until the image data level is transferred to the audio data level. For example, if the image data level is 10 bits/sec the data compression is 10 K times repeated so that the audio data level is $10^4$ bits/sec. FIGS. 3(E)-(G) represent subroutines to be used in the data reconstruction method.

In an embodiment of the present invention described above, if the image data are extracted by the tuner T of the image processing circuit 1 in the transmitter, the extracted data are separated into an audio signal A and an image signal by the demodulator DEMO. The separated audio signal A is then applied to the multiplexer MUX, while the image signal is applied to both the low pass filter LPF and to the decoder DEC. Next, the brightness signal Y is provided from the low pass filter LPV and the color difference signals R-Y, B-Y are provided from the decoder DEC. The color difference signals are applied to the multiplexer MUX to be transmitted through a signal information channel. The output signal of the multiplexer MUX is converted to digital data by the A/D converter 2, and then this data is compressed by the data compression device 3.

Now, the data compression method will be described. First, it is assumed that the level of the image data of 108 bits/sec is compressed to that of the audio data of $10^4$ bits/sec. The digital data of 40 kbits provided from the A/D converter 2 is stored in the RAM and the stored data is converted to the factorial-code $Q_1$, $Q_n$ by the steps S1 to S4 for the factorial-code-conversion routine L1 in FIG. 3(A). The digital data D is converted to a factorial-code $Q_n$ $Q_{n-1} \ldots Q_1$, by the following relationship: $D = Q_n \times n! + Q_{n-1} \times (n-1)! + \ldots + Q_2 \times 2! + Q_1 \times 1! \ldots$ (1)

For example, input digital data .08H corresponds to the factorial-code 0110 by using the above mentioned formula(1).

$$08H = 0 \times 4! + 1 \times 3! + 1 \times 2! + 0 \times 1!$$

Such a factorial-code $Q_n Q_{n-1} \ldots Q_1$ is converted to the factorial weight form D1 to DN. The rule of the cubic conversion is illustrated in FIG. (3(B)). For the factorial-code 0110 and N=5, since Q1=0, A=N−(Q1−1)=6 and A=N+1=6 so that a reference data 12345 is provided without the cubic-conversion. Next, since Q2=1, then A=N−(Q2−1)=5 and A(=5)≠N+1=6 so that the reference code is changed to a cubic code '15342', that is, the positions of 2 and 5 are exchanged. Next, since Q3=1, A=N−(Q3−1)=5 and A≠N=1=6 so that the once changed cubic-code 15342 is again changed to 15243, that is, the positions of 3 and 2 are exchanged.

In other words, if the cubic condition, that is, A≠N+1, is satisfied, the cubic bit corresponding to the present position is exchanged with the lowest bit. To summarize this cubic-code-conversion rule, it is given by Table 1.

TABLE 1

| level | factorial code | reference data | cubic code |
|---|---|---|---|
| 1 | Q1(0) | 12345 | 12345 |
| 2 | Q2(1) | 12345 | 15342 |
| 3 | Q3(1) | 15342 | 15243 |
| 4 | Q4(0) | 15243 | 15243 |

Table 2 shows the relationship between factorial-code $Q_1 \sim Q_n$ outputted by the input digital data and factorial weight form $D_1 \sim D_n$ converted to the cubic code by the factorial-code.

TABLE 2

| INPUT DATA | FACTORIAL NO | LEVEL 1(Q1) | LEVEL 2(Q2) | LEVEL (Q3) | LEVEL (Q4) |
|---|---|---|---|---|---|
| 0 0H | 12345 | 0 | 0 | 0 | 0 |
| 0 1H | 12354 | 0 | 0 | 0 | 1 |
| 0 2H | 12543 | 0 | 0 | 1 | 0 |
| 0 3H | 12534 | 0 | 0 | 1 | 1 |
| 0 4H | 12435 | 0 | 0 | 2 | 0 |
| 0 5H | 12453 | 0 | 0 | 2 | 1 |
| 0 6H | 15342 | 0 | 1 | 0 | 0 |
| 0 7H | 15324 | 0 | 1 | 0 | 1 |
| 0 8H | 15243 | 0 | 1 | 1 | 0 |
| 0 9H | 15234 | 0 | 1 | 1 | 1 |
| 0 AH | 15432 | 0 | 1 | 2 | 0 |
| 0 BH | 15423 | 0 | 1 | 2 | 1 |
| 0 CH | 14325 | 0 | 2 | 0 | 0 |
| 0 DH | 14352 | 0 | 2 | 0 | 1 |
| 0 EH | 14523 | 0 | 2 | 1 | 0 |
| 0 FH | 14532 | 0 | 2 | 1 | 1 |
| 1 0H | 14235 | 0 | 2 | 2 | 0 |
| 1 1H | 14253 | 0 | 2 | 2 | 1 |
| 1 2H | 13245 | 0 | 3 | 0 | 0 |
| 1 3H | 13254 | 0 | 3 | 0 | 1 |
| 1 4H | 13542 | 0 | 3 | 1 | 0 |
| 1 5H | 13524 | 0 | 3 | 1 | 1 |
| 1 6H | 13425 | 0 | 3 | 2 | 0 |
| 1 7H | 13452 | 0 | 3 | 2 | 1 |
| . | . | . | . | . | . |
| . | . | . | . | . | . |
| . | . | . | . | . | . |
| 7 7H | 23151 | 4 | 3 | 2 | 1 |

The factorial weight form $D_1 \sim D_n$ is provided as internal bits in $I_{n-1} \ldots I_1$ and adaptive bits $A_1 \sim A_M$ by the FASCM routine 1.3, where the internal bit is produced by comparing the present bit with the previous data, while the adaptive bit is produced by comparing the cubic code with the previous internal bit.

Applying the FASCM routine 1.3 to permit the factorial weight form D1-D5 (15243) to be converted to the cubic code as an example, it is as follows. Since $D1(=1) > D2(=5)$, $I_1 = 1$, and similarly since $D2(=5) > D3(=2)$, $I_3 = 0$, and since $D3(=2) < D4(=4)$, $I_3 = 1$, and since $Dr(=4) > D5(=3)$, $I_4 = 0$. Thus, the internal bits corresponding to the factorial weight form 15243 are '1010'.

Conversely, there are three methods used o find the adaptive bits An $A_{n-1} \ldots A_1$ The first method is to extract the adaptive bit by searching the data from the largest of the data up to the present data when the previous internal bit is 1, whereas to extract the adaptive bit by searching from the smallest of the data up to the present data when the previous internal bit is 0.

For example, when the factorial weight form 15243 is replaced by the internal bits $I1I2I3I4 = 1010$, to find A1, since $I1 = 1$ and the next bit $I_2 = 0$, so that $a(=1)$ is the smallest of the bits a and b up to the present position and is compared with the next factorial weight form D3. Since $a < c$, $A1 = 1$. Similarly, to find A2, since $I3 = 1$, b which is the largest of the bits $a \sim c$ up to the present position is compared with d. Since $b > d$, $A2 = 0$. Similarly, the other adaptive bits A3 and A4 become all 1. Generally, the total number T of the adaptive bits $A_1 \sim A_n$ by the first method is given by formula (2) as follow.

$$
\begin{aligned}
T &= 1 + 2 + 2 + 3 + 3 + \ldots + \left(\frac{N}{2} - 1\right) + \left(\frac{N}{2} - 1\right) + \frac{N}{2} \\
&= 0 + 1 + 2 + 2 + 3 + 3 + \ldots + N - 2 + \frac{N}{2} \\
&= 1 + \frac{N}{2} + \left\{ \left[\frac{N-4}{2} \times (4 + N - 2)\right]/2 \right\} \\
&= \frac{(N^2 - 4)}{4}
\end{aligned}
\tag{2}
$$

The second method is to find the adaptive bits by searching the data on the basis of the upper data up to the present data when the previous internal bit is 1, while searching the data from the center of the lower data up to the present data when the previous internal bit is 0. The total number T of the adaptive bits $A_1 \sim An$ by the second method is given by formula (3) as follows.

$$
\begin{aligned}
T &= \log_2 1 + \log_2 2 + \log_2 2 + \log_3 3 + \ldots + \\
&\quad \log_2\left(\frac{N}{2} - 1\right) + \log_2\left(\frac{N}{2} - 1\right) + \log_2 \frac{N}{2} \\
&= \log_2\left\{ 1 \times 2 \times 3 \times \ldots \left[\frac{N}{2} - 1\right]\right\}^2 + \log_2 \frac{N}{2} \\
&= 2\log_2\left(\frac{N}{2} - 1\right)! + \log_2\left(\frac{N}{2}\right)
\end{aligned}
\tag{3}
$$

the first method produces the adaptive bit having the largest value as shown in Eq.(1) and thus the data compression ratio is more than 1. This means that there is no data compression effect. And in the second method, the data compression ratio is close to 1.

The third method is to find the adaptive bits by using the first method when the previous internal bit is 1 and by using the second method when the previous internal bit is 0.

To find the internal and adaptive bits from the factorial weight form abcdefghi(=764193258) according to the third method, by the FASCM conversion routine, a(=7)>c(=6) so that A1=0. Similarly c(=6)>d(=1) so that I3=0. Since I3=0, comparison begins from the lower data. Then, b(=4)>d(=1), so that A2=0. Also, since d=(1)<e=(9), I4=1. Then, the comparison is begun from the upper bits since a(=7)<e(=9), A3=1. Similarly since d(=1)<f(=3) and b(=4)>f(=3), A4=1 and A5=0.

Subsequently, since d(=1)<g(=2), I=1 and since e(=9)>h(=5), a(=7)>h(=5), c(=6)>h(=5), A7~A10 is 0001. Also, since e(=9)>i(=8) and a(=-7)<i(=8), A11=0 and A12=1. Thus, if the factorial weight form DOD1 ... DN is 746193258, the internal bits I1I2 ... I8 becomes 01010011 by the steps S16~S23, and the adaptive bits A1A2 ... A12 001101000101 by the steps S24~S32. The total number of the adaptive bits according to the third method is given by formula (4) as follows $$T=1+4+4+...=4N \quad (4)$$

The factorial weight form D1D2 ... Dn is provided as the internal bits and the adaptive bits by the FASCM routine 1.3 and the compressed data are again stored in the RAM. In the RAM, the data of 20 kbits are incorporated with new data of 20 kbits and this data of 40 kbits are again compressed by the data compression method.

For example, the data compression is 10 K times repeated to compress the image data level of 10 bits/sec down to the audio data level of $10^4$ bits/sec.

Then, the final compressed data become 20 kbits and this data of 20 kbits are stored in the first memory 4.

The data stored in the first memory 4 is applied to the first modulator/demodulator MODEM 1 through the first telephone TEL1 in the transmitting circuit 5.

At this time, the image-transmission control signal is provided from the microcomputer MICOM 1.

Conversely, the transmitted data through the MODEM 1 in the transmitting circuit 5 are applied to the MODEM2 in the receiving circuit 6 and the output data of MODEM 2 are stored in the second memory 7 through the telephone TEL2. At this time, the image-reception control signal is provided from the MICOM 2. Then, the data stored in the second memory 7 are reconstructed to the original image data by the data reconstruction device 8.

Now, the data reconstruction method will be described in detail. The data stored in the second memory 7 are converted to the factorial weight form D1D2 .. DN by the inverse FASCM routine 1.4 in FIG. 3(D). In other words, the internal bits I1I2 ... In−1 and the adaptive bits A1A2 ... AM are arranged in sequence of the data magnitude by steps S100~s101 and the arranged data are changed to the factorial weight form $D_1 \sim D_n$.

For example, if it is assumed that internal bits I1I2I3I4 are 1010, the adaptive bits A1A2A3A4 are 1011, and the reference data are a b c d e, respectively, the relationships a<b, b>c, c<d and d>e are satisfied according to the internal bits 1010, and also the relationships a<c, b>d, a<e, and c<e are satisfied according to the adaptive bits 1011. Thus, the data are arranged in sequence of a, b, c, d, e and so the factorial weight form D1D2 ... D5 becomes 1 5 2 4 3.

As mentioned above, the data stored in the second memory 7 are reconstructed to the factorial weight form D1D2 ... DN by the inverse FASCM routine 1.4, and the factorial weight form $D_1 \sim Dn$ is reconstructed to the factorial-code Q1Q2 ... QN by the inverse cubic-code-conversion routine 1.5 in FIG. 3(e). In the inverse cubic-code-conversion routine L5, the reference data (R(1)=1, R(2)=2, ..., R(N)=N) are set by the steps S104~S107, as shown in FIG. 3(F), and the default data (d1=1, d2=2, ..., dN=N) corresponding to the factorial weight form $D_1D_2$ ... DN are also set. That is, for d1=1 and D1=5, R(D1)=R(5)=5.

At this point, if the default data di is proven to be identical to the reference data R(Di) by the steps S100~S103, then the factorial-code Qi=0 by the step S108, but if not, the factorial-code Qi is satisfied at the formula (5) by the step S110.

$$Qi=N+1-Di \quad (5)$$

Additionally, if the default data di is not identical to the reference data R(Di), R(di) becomes equal to R(Di) by the step S111. For example, if it is assumed that the factorial weight form D1D2D3D4D5=54123, the default data d1d2d3d4d5=12345, and R(1)=1, R(2)=2, R(3)=3, R(4)=4, and R(5)=5, then A1=N+1−D1=6−5=1 since R(D1)=5≠R(d1)=1 and R(di) (=R(1)) is changed to R(D1) (=5), namely, R(1)=5. Thus, the reference data R(1)R(2R(3)R(4)R(5) become 52345. In a similar manner, R(D2)=R(4)=4 and R(D2)=4≠R(d2)=2, and thus, Q2=N+1−D2=6−4=2.

Consequently, R(d2) is changed to R(D2) (=4) and then R(1)R(2) R(3)R(4)R(5)=52345. The extracted factorial-code Q1Q2 ... Zn using the above method is converted to the original data by the steps S116~S119. For example, if the factorial code is 0110, the original data is provided by the following equation $$D=0\times 4!+1\times 3'+1\times 2'+0\times 1!=08H$$

The resulting reconstructed data are provided to the demultiplexer DEMUX in the data processing circuit 9 and by the demultiplexer DEMUX, the data are provided as the brightness signal Y, the color difference signals R-Y and B-Y, and the audio signal A through four channels. These signals, on the other hand, are converted to the analog signals by the digital/analog converter DAC1~CAC4, and the image analog signals, that is, Y B-Y, and R-Y, are applied to the encoder ENC and so displayed on the screen as a single data. The audio analog signal is provided as before.

As described above, the audio and image data are provided through a single information channel by the multiplexer MUX in the image processing circuit. The output signal is converted to the digital signal by the A/D converter 2, and this digital signal is compressed from the image data level to the audio data level and is stored in the first memory 4 by the data compression device 3. The compressed data are then transmitted through the conventional transmitting circuit 5. The data transmitted from the transmitter are reconstructed by the data reconstruction device 8 and the reconstructed data are displayed on the screen by the demultiplexer DEMUX, the digital/analog converters DAC 1~DAC4, and the encoder ENC in the data processing circuit 9. Each data conversion formula in the data compression method is as follows:

(i) factorial-code-conversion $$\text{digital data } D = Qn \times n! + Qn-1 \times (n-1)! + \ldots + Q2 \times 2! + Q1 \times 1!$$

(ii) cubic-code-conversion $$\text{data } A = N - (Qn-1)$$

and if $A = N+1$, no cubic conversion, but if not $A = B$ (iii) FASCM a) internal bit $$\begin{array}{ll} \text{if } Di-1 > Di & Ii = 0 \\ Di-1 < Di & Ii = 1 \end{array}$$

b) adaptive bit

If $Ii-1=1$, compare from the largest data up to the present one

If $Ii-1=0$, compare from the smallest data up to the present one

Also, each data conversion formula in the data reconstruction method is as follows:

(i) inverse FASCM extract the factorial weight form $D_1 \sim Dn$ by arranging the data stored in the second memory 7 according to the internal and adaptive bits.

(ii) inverse cubic-code-conversion

If default data $di$ = factorial weight form $Di$, factorial-code $Qi$ = reference data $R(Di)$ $$\text{if } di \neq Di, \; Q8 = N+1-Di \text{ and } R(di) = R(Di)$$

(iii) inverse factorial-code-conversion $$\text{the digital data } D = QN \times N! + QN-1 \times (N-1)! + \ldots + Q2 \times 2! + Q1 \times 1!$$

According to the present invention described above, the image processing system can transmit and receive the image data through the conventional communication network by compressing the digital image data down to the audio data level. Secondly, the data compression can be repeated without any data loss by the factorial-code-conversion, cubic-code-conversion, and FASCM processes.

Furthermore, according to the present invention, since the memory size for storing the image data becomes smaller and also the recording or playback of the image data can be performed by the memories, the rotary-head drum of the conventional VTR can either be replaced by the fixed drum or can be removed, thereby making it possible to reduce the size of the video tape recorder.

The present invention is in no way limited to the embodiment described hereinabove. Various modifications of the disclosed embodiment as well as other embodiments of the invention will become apparent to persons skilled in the art upon reference to the description of the present invention. It is therefore believed that the appended claims will cover any such modifications or embodiments which fall within the true scope of the present invention.

What is claimed is:

1. An image processing system, comprising:
    a transmitter comprising:
        an image processing circuit for providing input image data to a single information channel,
        an analog-to-digital converter connected to an output stage of said image processing circuit,
        data compression means connected to an output stage of said analog-to-digital converter, for generating compressed data by compressing a level of the input image data to an audio data level,
        a first memory connected to an output stage of said data compression means, for storing the compressed data, and
        a transmitting circuit connected to an output stage of said first memory,
        for providing transmitted data by transmitting said compressed data through a conventional communication network; and
    a receiver comprising:
        a receiving circuit for receiving said transmitted data from said transmitting circuit in said transmitter,
        a second memory connected to an output stage of said receiving circuit, for storing said transmitted data,
        data reconstruction means connected to an output stage of said second memory, for providing reconstructed data by reconstructing original image data from said transmitted data, and
        a data processing circuit connected to said data reconstruction means, for displaying said reconstructed data on a screen.

2. An image processing system, comprising:
    an image processing circuit for providing input data signals to a single information channel to provide a processed data signal;
    an analog-to-digital converter connected to said image processing circuit for converting said processed data signal to a digital signal;
    data compression means connected to said analog-to-digital converter, for providing compressed data by compressing a level of digital signal to a level of audio data;
    a memory connected to the output stage of said data compression means, for storing said compressed data;
    data reconstruction means connected to said memory, for providing reconstructed data signals by reconstructing original data from said compressed data; and
    a data processing circuit connected to said data reconstruction means for displaying said reconstructed data on a screen.

3. A data modulation-and-demodulation method in an image processing system, comprising:
    a data compression process comprising:
        a factorial-code-conversion routine, for converting input data signals representing digital image data received from an analog-to-digital converter into a first factorial code;
        a cubic-code-conversion routine for converting said first factorial code provided from said factorial-code-conversion routine into a first cubic code; and
        a first factorial-adaptive-size-comparison-method routine for comparing a magnitude of a given bit of said first cubic code with magnitudes of other bits of said first cubic code, and for providing internal and adaptive bits; and
    ·a data reconstruction routine comprising:

an inverse factorial-adaptive-size-comparison-method routine, for converting said internal and adaptive bits into a second cubic code;

an inverse cubic-code-conversion routine for extracting a second factorial code from said second cubic code of said inverse factorial-adaptive-size-comparison-method routine; and an inverse factorial-code-conversion routine for reconstructing said second factorial code as output data signals indicative of said input data signals.

4. A data modulation-and-demodulation method according to claim 3, wherein said factorial-code-conversion routine satisfied the following formula:

$$\text{digital image data } D = Q_n \times N! + Q_n - 1 \times (N-1)! + \ldots \\ = Q_2 \times 2! + Q_1 \times 1',$$

where $Q_1 Q_2 \ldots Q_n$ is aid first factorial code.

5. A data modulation/demodulation method according to claim 3, wherein said cubic-code-conversion routine is carried out in such a manner that $A = N - (Q_n - 1)$, and if A does not equal N+1, a nth bit of a factorial-code is exchanged, while if A=n+1, the cubic conversion routine is not carried out, wherein $Q_n$ is first cubic code data, and n>N.

6. A data modulation-and-demodulation method according to claim 3, wherein said factorial-adaptive-size-comparison method routine comprises the steps of:

comparing previous data from an immediately preceding bit of said first cubic code with current data from said first cubic code, setting an internal bit to a logic "1" when current data is larger than said previous data, and setting said internal bit to a logic "0" when said current data is smaller than said previous data; and extracting adaptive bits by comparing data from a largest item of preceding data of said first cubic code up to the current data of said first cubic code when the internal bit is a logic "1" and comparing data from a least item of said first cubic code up to the current data of said first cubic code when an internal bit is a logic "0".

7. A data modulation-and demodulation method according to claim 6, wherein said inverse factorial-adaptive-size-comparison routine comprises the steps of extracting said second cubic code by arranging a reference data into a sequence of magnitude according to said internal and adaptive bits.

8. A data modulation-and-demodulation method according to claim 3, wherein said inverse cubic-code-conversion routine comprises the steps of:

setting a default data into a series of integers; and setting an ith bit of said second factorial code to logic "0" when the ith bit of said reference data is equal to the ith bit of said default data, while setting the ith bit of said second factorial code equal to $N+1-D_i$ and setting to $R(d_i)$ when the ith bit of said reference data is not equal to the ith bit of said default data, where $D_i$ is second cubic code data, $d_i$ is default data, $R(D_i)$ is reference data, and i>N.

9. A data modulation-and demodulation method according to claim 6, wherein said inverse factorial-adaptive-size-comparison routine comprises the step of extracting said second cubic code by arranging a reference data in a sequence of magnitude according to said internal and adaptive bits.

10. The image processing system as claimed in claim 1, wherein said data compression means:

converts input data signals representing digital image data into a first factorial code;

converts said first factorial code into a first cubic code; and compares the magnitude of given bits of said first cubic code, and for providing internal and adaptive bits.

11. The image processing system as claimed in claim 10, wherein said data reconstruction means:

converts said internal bits and said adaptive bits into a second cubic code;

extracts a second factorial code from said second cubic code; and converts said second factorial code into reconstructed data signals, indicative of said input data signals.

12. The image processing system as claimed in claim 2, wherein said data compression means:

converts said digital signal representing digital image data into a first factorial code;

converts said first factorial code into a first cubic code; and compares a magnitude of a given bit of said first cubic code with magnitudes of other bits of said first cubic code, and for providing internal and adaptive bits.

13. The image processing system as claimed in claim 12, wherein said data reconstruction means:

converts said internal and adaptive bits into a second cubic code;

extracts a second factorial code from said second cubic code; and converts said second factorial code into said reconstructed data signals, indicative of said digital signal.

14. The image processing system as claimed in claim 13, wherein said data compression means converts said digital signal into a first factorial code according to the following formula:

$$\text{data } D = Q_n \times N! + Q_{N-1} \times (N-1)! + \ldots \\ + Q_2 \times 2' + Q_1 1!,$$

where $Q_1 Q_2 \ldots Q_N$ is said first factorial code.

15. The image processing system as claimed in claim 14, wherein said data compression means converts said first factorial code into said first cubic code according to the following, wherein $A = N - (Q_n - 1)$:

if A does not equal N+1, a nth bit of said first factorial code is exchanged, if A=N+1, no conversion is done, where $Q_n$ is a first cubic code data, and n>N.

16. The image processing system as claimed in claim 15, wherein said data compression means compares the magnitude of said given bit of said first cubic code by:

comparing previous data from an immediately preceding bit of said first cubic code with current data from aid first cubic code, and setting said internal bit to a first logic state when said current data is smaller than said previous data; and extracting adaptive bits by comparing data from a largest item of preceding data of said first cubic code up to the current data of said first cubic code when said internal bit is a second logic state, and for comparing data from a least item of said first cubic code up to the current data when said internal bit is a first logic state.

17. The image processing system as claimed in claim 16, wherein said data reconstruction means extracts a second cubic code by arranging a reference data into a sequence of magnitude according to said internal and adaptive bits.

18. The image processing system as claimed in claim 17, wherein said data reconstruction means extracts said second factorial codes by:
setting a default data into a series of integers; and
setting an ith bit of said second factorial code to said first logic state when said it bit of said reference data is equal to the ith bit of said default data, and for setting the ith bit of said second factorial code equal to $N+1-D_i$ and setting $R(D_i)$ to $R(d_i)$ when the ith reference data is not equal to the ith bit of said default data, where $D_i$ is second cubic code data, $d_i$ is default data, $R(D_i)$ is reference data, and $i>N$.

19. The image processing system as claimed in claim 2, wherein said image processing circuit comprises:
tuning means for receiving a composite signal;
demodulation means for separating said composite signal into an image signal and an audio signal;
first filter means for extracting a luminance signal from said image signal;
decoding means for separating said image signal into color difference signals;
multiplexing means for alternately enabling transmission of one of said luminance signal, color difference signals and audio signal to said analog-to-digital converter.

20. The image processing system as claimed in claim 2, wherein said data processing circuit comprises:
demultiplexing means for separating said reconstructed data into a reconstructed luminance signal, reconstructed color difference signals and a reconstructed audio signal; and
second, third, fourth and fifth filter means for filtering each of said reconstructed luminance signal, reconstructed color difference signals and reconstructed audio signal, respectively, to generate a filtered luminance signal, filtered color difference signals and a filtered audio signal;
encoding means for encoding said filtered luminance signal, filtered color differences signals and filtered audio signal to generate said reconstructed data.

21. The image processing system as claimed in claim 19, wherein said data processing circuit comprises:
demultiplexing means for separating said reconstructed data into a reconstructed luminance signal, reconstructed color difference signals and a reconstructed audio signal; and
second, third, fourth and fifth filter means for filtering each of said reconstructed luminance signal, reconstructed color difference signals and reconstructed audio signal, respectively, to generate a filtered luminance signal, filtered color difference signals and a filtered audio signal;
encoding means for encoding said filtered luminance signal, filtered color differences signals and filtered audio signal to generate said reconstructed data.

22. The image processing system as claimed in claim 21, further comprising:
first telephone means for receiving compressed data from said memory;
first modem means for transmitting said compressed data received from said first telephone means over a telephone line; and
first control means for providing an image-transmission signal to said first telephone means.

23. The image processing system as claimed in claim 22, further comprising:
second modem means for receiving said compressed data over the telephone line; and
second telephone means for receiving said compressed data from said second modem means;
second control means for providing an image-reception signal to said second telephone means.

24. A circuit for compressing and expanding digital image data in an image processing system, comprising:
memory means for storing said digital image data; and
data compression means for:
converting said digital image data into a first factorial code according to the following formula:

*digital data* $D = Q_n = Q_N \times N! + Q_{N-1} \times (N-1)! + \ldots + Q_2 \times 2! + Q_1 1'$, where $Q_1 Q_2 \ldots Q_N$ is said first factorial code;
converting said first factorial code into a first cubic code by switching bits of reference data according to the following formula:

*if* $N - (Q_n - 1) = N + 1$, then no bit switching otherwise, a nth bit of said reference data is switching with a $(N - (Q_n - 1))$th bit, generating said first cubic code $D_1 D_2 \ldots D_N$, where $n \leq N$;
comparing a magnitude of a given bit of said first cubic code with magnitudes of other bits of said first cubic code, and for providing internal bits and adaptive bits according to the following formulas:

*if* $D_{n-1} > D_n$, then $I_n = 0$, and

*if* $D_{n-1} < D_n$, then $I_n = 1$, where $I_1 I_2 \ldots I_{N-1}$ are said internal bits, and
if $I_{n-1} = 1$, comparing a largest bit of said cubic code up to the present bit of said cubic code to generate said adaptive bit,
if $I_{n-1} = 0$, comparing a smallest bit of said cubic code up to the present bit of said cubic code to generate said adaptive bit;
transmission means for transmitting said internal bits and said adaptive bits as a transmitted signal through a communication network, said internal bits and said adaptive bits representing said digital image data;
reception means for receiving said internal bits and aid adaptive bits from said communication network; and
data reconstruction means for:
receiving said internal bits and said adaptive bits from said reception means;
converting said internal bits and said adaptive bits into a second cubic code by arranging reference data according to said internal and adaptive bits;
extracting a second factorial code according to the following formula:

if default data $d_i$ = said second cubic code data $D_i$, then said second factorial code data $L_i$ = said reference data $R(D_i)$, otherwise $L_i = N + 1 - D_i$ and $R(d_i) = R(D_i)$;

converting said second factorial into a reconstructed digital signal according to the following formula:

reconstructed digital data $A = L_N \times N! + L_{N-1} \times (N-1)! + \ldots + L_2 \times 2! + L_1 1!$, where $L_1 L_2 \ldots L_N$ is a reconstructed factorial code; and display means for displaying said reconstructed digital signal.

25. A data modulation-and-demodulation method in an image processing system, comprising:

a data compression process comprising a factorial-code-conversion routine, for converting input data signals representing digital image data and digital audio data received from an analog-to-digital converter into a second data signal representing a factorial code;

a cubic-code-conversion routine for converting said factorial code provided from said factorial-code-conversion routine into a third data signal representing a cubic code;

a first factorial-adaptive-size-comparison-method routine for comparing a magnitude of a selected bit of said cubic code with magnitudes of other bits of said cubic code, and for providing a fourth data signal comprising internal and adaptive bits; and transmitting said fourth data signal through a transmission line.

26. A data modulation-and-demodulation method in an image processing system, comprising:

a data reconstruction routine comprising an inverse factorial-adaptive-size-comparison-method routine, for converting a first data signal comprising internal bits and adaptive bits representing image signals into a second data signal comprising a cubic code;

an inverse cubic-code-conversion routine for extracting a factorial code from said cubic code of said second data signal; and an inverse factorial-code-conversion routine for reconstructing said second factorial code to generate output data signals indicative of said image signals.

27. An image processing system, comprising:

image processing means for providing input image data to a single information channel;

data compression means for compressing said input image data from a level of a high frequency band to an audio data level of a low frequency band by compressing first input image data of a certain range, incorporating second image data to said first image data after said first image data is compressed, and repeatedly compressing said incorporated first and second image data, to generate compression data;

memory means connected to an output stage of said data compression means, for storing said compression data; and transmission means connected to an output stage of said memory means, for transmitting said compression data through a communication network as an electrical.

28. The image processing system as claimed in claim 27, further comprised of:

said data compression means converting said input image data into a first factorial code using a first factorial-code conversion routine;

converting said first factorial code provided from said factorial-code-conversion-routine into a first cubic code using a first cubic-code-conversion routine; and providing internal and adaptive bits by comparing a magnitude of a given bit of said first cubic code with magnitudes of other bits of said first cubic code using a first factorial-adaptive side-comparison-method.

29. An image processing system for converting compressed image data derived by compressing original image data and comprised of internal bits and adaptive bits, said image processing system comprising:

receiving means for receiving said compressed image data from a communication network as a first data signal;

memory means connected to an output stage of said receiving means, for storing said compressed image data;

data reconstruction means connected to an output stage of said memory means, for expanding said internal bits and said adaptive bits, in order to generate reconstructed image data, said reconstructed image data representing said original image data prior to compression; and data processing means connected to said data reconstruction means, for displaying said reconstructed image data.

30. The image processing system as claim in claim 29, further comprised of:

said data reconstruction means converting said internal bits and said adaptive bits representing image signals into a cubic code using an inverse factorial-adaptive-size-comparison-method routine;

extracting a factorial code from said cubic code of said inverse factorial-adaptive-size-comparison-method routine using an inverse cubic-code-conversion routine; and reconstructing said factorial code to generate output data signals indicative of said original image data using an inverse factorial-code-conversion routine.

* * * * *

UNITED STATES PATENT AND TRADEMARK OFFICE
CERTIFICATE OF CORRECTION

PATENT NO.  : 5,333,063
DATED       : July 26, 1994
INVENTOR(S) : Jae Chern Yoo

It is certified that error appears in the above-indentified patent and that said Letters Patent is hereby corrected as shown below:

IN THE CLAIMS

Column 10, Line 2, Change comma "," to semicolon --;-- ;

Line 4, Change comma "," to semicolon --;-- ;

Line 8, Change comma "'," to semicolon --;-- ;

Line 11, Change comma "," to semicolon --;-- ;

Line 14, Move Line 14 in its entirety to Line 13 after "memory, " ;

Line 15, Change "through" to --via--, Delete "conventional" ;

Line 20, After "transmitter", Insert --via said communication network;--,

Delete comma "," ;

Line 23, After "data", Change comma "," to semicolon ";" ;

UNITED STATES PATENT AND TRADEMARK OFFICE
CERTIFICATE OF CORRECTION

PATENT NO. : 5,333,063
DATED : July 26, 1994
INVENTOR(S) : Jae Chern Yoo

It is certified that error appears in the above-indentified patent and that said Letters Patent is hereby corrected as shown below:

Line 26, Preceding "reconstructing", Insert --representative of said input image data--, Delete "original" ;

Line 27, Delete "image data from" ,Change comma "," to semicolon --;--;

Line 33, After "provide", Delete "a" ;

Line 34, Change "signal" to --signals-- ;

Line 37, Replace "signal to a" with --signals into--, After "digital", Change "signal" to --signals-- ;

Line 39, After "data", Insert --signals-- ;

Line 40, Preceding "digital", Insert --said--, Change "signal" to --signals--, Replace "a level of" with --an-- ;

UNITED STATES PATENT AND TRADEMARK OFFICE
CERTIFICATE OF CORRECTION

PATENT NO. : 5,333,063
DATED : July 26, 1994
INVENTOR(S) : Jae Chern Yoo

Page 3 of 14

It is certified that error appears in the above-indentified patent and that said Letters Patent is hereby corrected as shown below:

Line 41, After "data", Insert --level-- :

Line 44, After "data", Insert --signals-- ;

Line 46, After "signals", Insert --representative of said input data signals--;

Line 47, Delete "original data from" ;

Line 48, After "data", Insert --signals-- ;

Line 51, After "data", Insert --signals as a variable visual display varying in dependence upon said reconstructed data signals--, After "screen", Insert --providing a variable visual display--;

Line 54, after "process" insert --to generate compressed data by compressing input data signals representing digital image data, said data compression process--

Line 55, After "routine", Delete comma "," ;

Line 57, Delete "received from an analog-to-digital converter" ;

UNITED STATES PATENT AND TRADEMARK OFFICE
CERTIFICATE OF CORRECTION

PATENT NO. : 5,333,063  
DATED : July 26, 1994  
INVENTOR(S) : Jae Chern Yoo

Page 4 of 14

It is certified that error appears in the above-indentified patent and that said Letters Patent is hereby corrected as shown below:

| | | |
|---|---|---|
| | Line 63, | Delete "first", Delete "-method" ; |
| | Line 67, | Delete "and" ; |
| | Between Lines 67 and 68, | Insert following two paragraphs -- transmitting said compressed data via a communication network; receiving said compressed data via said communication network;-- ; |
| | Line 68, | Preceding "a data", Insert --performing--, Replace "routine" with --process to generate reconstructed data signals indicative of said input data signals by reconstructing said compressed data received via said communication network, said data reconstruction process-- ; |
| Column 11, | Lines 1 and 2, | Delete "-method" ; |
| | Line 3, | After "bits", Insert --contained within said compressed data received via said communication network-- ; |

UNITED STATES PATENT AND TRADEMARK OFFICE
CERTIFICATE OF CORRECTION

PATENT NO. : 5,333,063
DATED : July 26, 1994
INVENTOR(S) : Jae Chern Yoo

Page 5 of 14

It is certified that error appears in the above-indentified patent and that said Letters Patent is hereby corrected as shown below:

Line 7,   Delete "-method" ;

Line 9,   Delete "out-" ;

Line 10,  "output", preceding "data", insert --said reconstructed--

Line 16,  After "*data*", Insert comma "," ;

Line 17,  change "1'" to read --1!--

Line 19,  After "$Q_1$", Insert comma --,--, Change "aid" to --said--;

Line 21,  Replace "wherein" with --further comprised of performing--;

Line 22,  Delete "is carried out in such a manner that" ;

Line 23,  Preceding "A", Insert --with-- ;

Line 24,  Preceding "a nth", Insert --exchanging--;

Line 25,  Delete "is exchanged", Change "cubic conversion" to --cubic-code-conversion-- ;

Line 26,  Delete "wherein" ;

UNITED STATES PATENT AND TRADEMARK OFFICE
CERTIFICATE OF CORRECTION

PATENT NO. : 5,333,063
DATED : July 26, 1994
INVENTOR(S) : Jae Chern Yoo

It is certified that error appears in the above-indentified patent and that said Letters Patent is hereby corrected as shown below:

|  |  |  |
|---|---|---|
|  | Line 27, | Delete "data" ; |
|  | Line 30, | Delete "method" ; |
|  | Line 34, | Delete "said" ; |
|  | Line 35, | Replace "previous" with --the immediately preceding--; |
|  | Line 41, | Change "the" to --said-- ; |
|  | Line 43, | Change "an" to --said-- ; |
| Column 12, | Line 3, | Preceding "input", Insert --the--, After "input", Insert --image-- ; |
|  | Line 12, | After "bits", Insert --contained within said transmitted data received via said communication network--; |
|  | Line 17, | Replace "signals, indicative" with --representative--, After "input", Insert --image-- ; |
|  | Line 18, | delete "signals" |
|  | Line 21, | Change "signal" to --signals--, Delete "representing digital image" ; |

UNITED STATES PATENT AND TRADEMARK OFFICE
CERTIFICATE OF CORRECTION

PATENT NO. : 5,333,063
DATED : July 26, 1994
INVENTOR(S) : Jae Chern Yoo

It is certified that error appears in the above-indentified patent and that said Letters Patent is hereby corrected as shown below:

Line 22, Delete "data";

Line 32, After "bits", Insert --contained within said compressed data signals-- ;

Line 37, Delete ", indicative of said digital signal";

Line 40, Replace "wherein" with --further comprised of--, Change "converts" to --converting-- ;

Line 41, Change "signal" to --signals-- ;

Line 45, Change "2' " to --2!-- :

Line 47, After "$Q_1$", Insert comma --,-- ;

Line 49, Replace "wherein" with --further comprised of--, Change "converts" to --converting-- ;

Line 57, Replace "wherein" with --further comprised of--, Change "compares" to --comparing-- ;

Column 13, Line 4, Replace "wherein" with --further comprised of--, Change "extracts" to --extracting--;

UNITED STATES PATENT AND TRADEMARK OFFICE
CERTIFICATE OF CORRECTION

PATENT NO. : 5,333,063
DATED : July 26, 1994
INVENTOR(S) : Jae Chern Yoo

It is certified that error appears in the above-indentified patent and that said Letters Patent is hereby corrected as shown below:

| | |
|---|---|
| Line 9, | Replace "wherein" with --further comprised of--, Change "extracts" to --extracting--; |
| Line 11, | After "setting", Delete "a"; |
| Line 15, | Preceding "setting", Delete "for"; |
| Line 19, | Preceding "default", Insert --said--; |
| Line 20, | Change "i>N" to --i$\leq$=N--; |
| Line 23, | Delete "a", Change "signal" to --signals--; |
| Line 25, | Preceding "into", Change "signal" to --signals--; |
| Line 38, | After "data", Insert --signals--; |
| Line 40, | Delete "and"; |
| Line 41, | Delete "second, third, fourth and fifth filter"; |
| Line 48, | Preceding "filtered", Insert --said-- (both occurrences), Change "differences" to --difference--; |

UNITED STATES PATENT AND TRADEMARK OFFICE
CERTIFICATE OF CORRECTION

PATENT NO. : 5,333,063
DATED : July 26, 1994
INVENTOR(S) : Jae Chern Yoo

It is certified that error appears in the above-indentified patent and that said Letters Patent is hereby corrected as shown below:

| | | |
|---|---|---|
| | Line 49, | After "data", Insert --signals-- ; |
| | Line 51, | Replace "wherein" with --further comprised of--, Change "comprises" to --comprising-- ; |
| | Line 56, | Delete "second, third, fourth and fifth filter" ; |
| | Line 57, | After "signal,", Insert --said-- ; |
| | Line 58, | Preceding "reconstructed", Insert --said-- ; |
| | Line 63, | Preceding "filtered", Insert --said-- (both occurrences), Change "differences" to --difference-- ; |
| | Line 64, | After "data", Insert --signals-- ; |
| | Line 68, | After "data", Insert --signals-- ; |
| Column 14, | Line 2, | After "data", Insert --signals--, Replace "over" with --via--; |
| | Line 9, | Replace "over" with --signals via--; |

UNITED STATES PATENT AND TRADEMARK OFFICE
CERTIFICATE OF CORRECTION

PATENT NO. : 5,333,063
DATED : July 26, 1994
INVENTOR(S) : Jae Chern Yoo

It is certified that error appears in the above-indentified patent and that said Letters Patent is hereby corrected as shown below:

| | | |
|---|---|---|
| | Line 11, | After "data", Insert --signals--; |
| | Line 22, | Delete "$Q_n=$"; |
| | Line 23, | Change "1' " to --1!--; |
| | Line 25, | After "$Q_1$", Insert comma --,--; |
| | Line 30, | "no bit switching" should read --switching no bits of said reference data-- |
| | Line 32, | Replace "otherwise" with --if $N-(Q_n-1) \neq N+1$, switching--, Delete "is"; |
| | Line 33, | Delete "switching"; |
| | Line 34, | After "$D_1$", Insert comma --,--, Change "$n \underline{\leq}$" to --$n \leq$--; |
| | Line 46, | After "$I_1$", Insert comma --,--; |
| Column 15, | Line 4, | Replace "otherwise" with --if said default data, $d \neq$ said second cubic code data $D_j$, --; |
| | Line 14, | Replace "processing" with --compression--; |

UNITED STATES PATENT AND TRADEMARK OFFICE
CERTIFICATE OF CORRECTION

PATENT NO. : 5,333,063
DATED : July 26, 1994
INVENTOR(S) : Jae Chern Yoo

It is certified that error appears in the above-indentified patent and that said Letters Patent is hereby corrected as shown below:

Line 15, Replace "a data compression process comprising" with --performing--;

Line 16, After "routine", Delete comma "," ;

Line 21, Preceding "a", Insert --performing--;

Line 25, Preceding "a", Insert --performing--, Delete "-method" ;

Line 34, Replace "processing" with --reconstruction-- ;

Line 35, Replace "a data reconstruction routine comprising" with --performing--;

Line 37, Preceding "for", Delete comma "," ;

Line 41, Preceding "an", Insert --performing-- ;

Line 43, Delete "and" ;

Line 44, Preceding "an", Insert --performing-- ;

after line 46 insert --providing a video signal enabling a variable visual display varying in dependence upon said output data signals.--

UNITED STATES PATENT AND TRADEMARK OFFICE
CERTIFICATE OF CORRECTION

PATENT NO. : 5,333,063
DATED : July 26, 1994
INVENTOR(S) : Jae Chern Yoo

It is certified that error appears in the above-indentified patent and that said Letters Patent is hereby corrected as shown below:

|  |  |  |
|---|---|---|
|  |  | output data signals.--; |
| Column 16, | Line 17, | Delete "first" ; |
|  | Line 22, | Delete "first" ; |
|  | Line 23, | Replace "-method" with --routine-- ; |
|  | Line 35, | After "for", Insert --generating reconstructed image data representing said original image data, by--; |
|  | Line 41, | After "displaying", Insert --variable visible images varying in dependence upon-- ; |
|  | Line 46, | Preceding "image", Insert --said original-- ; |
|  | Line 47, | Replace "signals" with --data-- ; |
|  | Line 48, | Delete "-method" ; |
|  | Line 50, | Delete "-method" ; |

UNITED STATES PATENT AND TRADEMARK OFFICE
CERTIFICATE OF CORRECTION

PATENT NO. : 5,333,063
DATED : 07/26/94
INVENTOR(S) : Jae Chern Yoo

It is certified that error appears in the above-indentified patent and that said Letters Patent is hereby corrected as shown below:

```
Column 15, line 46, change "signals." to read --signals: and--
Column 15, line 54,  "to" should read --into--
          line 56, "said" should read --the--

Column 16, line 9, after "electrical" insert --signal--
          line 11, after "of" delete -- : --
          line 12, "means" should read --means:--
          line 13, delete --first--
          lines 35-36, delete -- , in order to generate reconstructed image
                data, said reconstructed image data representing said
                original image data prior to compression--
          line 44, after "of" delete -- : --
          line 45, after "means" insert -- : --
```

UNITED STATES PATENT AND TRADEMARK OFFICE
CERTIFICATE OF CORRECTION

PATENT NO.  : 5,333,063
DATED       : July 26, 1994
INVENTOR(S) : Jae Chern Yoo

It is certified that error appears in the above-indentified patent and that said Letters Patent is hereby corrected as shown below:

```
Column 15, line 46, change "signals." to read --signals: and--
          line 54, "to" should read --into--
          line 56, "said" should read --the--

Column 16, line 9, after "electrical" insert --signal--
          line 11, after "of" delete -- : --
          line 12, "means: should read --means:--
          line 13, delete --first--
          line 35-36, delete -- , in order to generate reconstructed image
                data, said reconstructed image data representing said
                original image data prior to compression--
          line 44, after "of" delete -- : --
          line 45, after "means" insert -- : --
```

Signed and Sealed this

Twenty-ninth Day of November, 1994

BRUCE LEHMAN

Attesting Officer  Commissioner of Patents and Trademarks